United States Patent
Getman

(10) Patent No.: US 8,117,910 B2
(45) Date of Patent: Feb. 21, 2012

(54) APPARATUS FOR CAPACITIVE DETERMINING AND/OR MONITORING OF FILL LEVEL OF A MEDIUM

(75) Inventor: Igor Getman, Lörrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 418 days.

(21) Appl. No.: 12/084,114

(22) PCT Filed: Oct. 17, 2006

(86) PCT No.: PCT/EP2006/067514
§ 371 (c)(1),
(2), (4) Date: Aug. 26, 2009

(87) PCT Pub. No.: WO2007/048739
PCT Pub. Date: May 3, 2007

(65) Prior Publication Data
US 2010/0005879 A1   Jan. 14, 2010

(30) Foreign Application Priority Data
Oct. 27, 2005   (DE) .......................... 10 2005 051 794

(51) Int. Cl.
*G01F 23/26* (2006.01)
(52) U.S. Cl. .................................. 73/304 C; 73/304 R
(58) Field of Classification Search ................ 73/304 C
See application file for complete search history.

(56) References Cited

U.S. PATENT DOCUMENTS

| | | | | |
|---|---|---|---|---|
| 4,347,741 A * | 9/1982 | Geiger | ......................... | 73/304 C |
| 5,245,873 A | 9/1993 | Fathauer | | |
| 6,564,630 B1 * | 5/2003 | Klemp | ......................... | 73/304 C |
| 7,415,366 B2 * | 8/2008 | Florenz et al. | .................. | 702/57 |

FOREIGN PATENT DOCUMENTS

| | | |
|---|---|---|
| DE | 101 61 069 A1 | 6/2003 |
| DE | 10 2004 008 125 A1 | 9/2005 |
| WO | WO 2004/102133 A2 | 11/2004 |
| WO | WO 2005/078398 A1 | 8/2005 |

* cited by examiner

Primary Examiner — Hezron E Williams
Assistant Examiner — Paul West
(74) Attorney, Agent, or Firm — Bacon & Thomas, PLLC

(57) ABSTRACT

An apparatus for capacitive determining and/or monitoring of fill level of a medium in a container. The apparatus includes: A probe unit; a control unit, which supplies the probe unit with a drive signal; and an evaluating unit, which receives a response signal from the probe unit and which determines from the response signal a statement concerning fill level. Stored in the evaluating unit are at least a first and a second formula or a first and a second evaluating algorithm; and, in case accretion lies below a predetermined limit value, the evaluating unit determines the statement concerning fill level via a first formula and, in case accretion lies above the predetermined limit value, the evaluating unit determines the statement concerning fill level via a second formula.

8 Claims, 1 Drawing Sheet

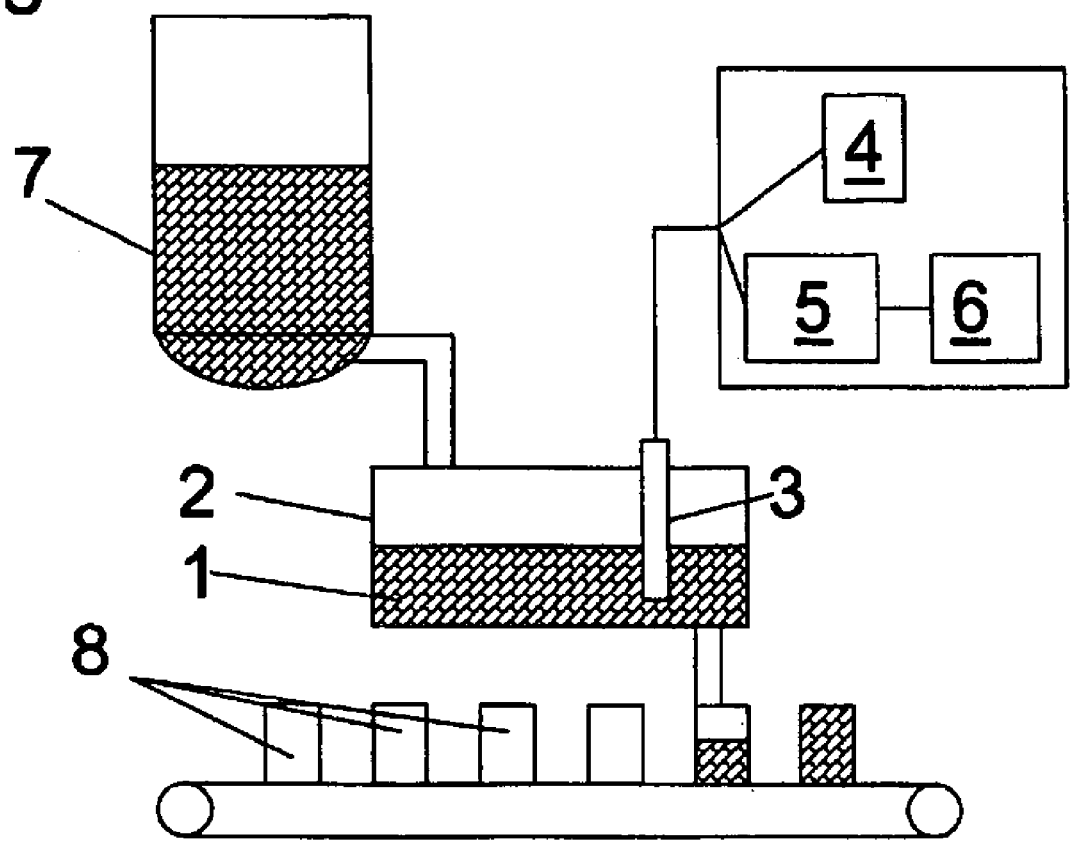

APPARATUS FOR CAPACITIVE DETERMINING AND/OR MONITORING OF FILL LEVEL OF A MEDIUM

TECHNICAL FIELD

The invention relates to an apparatus for capacitive determining and/or monitoring of fill level of a medium in a container and includes: At least one probe unit; at least one control unit, which supplies the probe unit with a drive signal; and least one evaluating unit, which receives from the probe unit at least one response signal and which determines from the response signal at least one statement concerning fill level, wherein the response signal has at least one amplitude and one phase relative to the drive signal and/or relative to a reference signal. The medium can be, for example, a liquid or a bulk good.

BACKGROUND DISCUSSION

Capacitive fill-level measuring devices are known in the state of the art. The measuring principle is based on having a measuring probe and a second probe, or the wall of the container in which the medium is located, form the two electrodes of a capacitor, with the medium as dielectric. The capacitance of the capacitor depends on the fill level of the medium and permits, consequently, the determining of fill level. For the measurement, the probe is usually supplied with a drive signal, which is an electrical alternating voltage of predeterminable frequency. The response signal is usually an electrical current signal, which is, most often, converted to an alternating voltage. From the response signal, then the fill level is determined.

A problem with this arrangement involves the fact that the medium can form an accretion on the probe, and the accretion then influences the measurement negatively. Especially, very viscous material tends to cling to the probe unit and thus form an accretion. Accretion can, in given circumstances, lead to the fact that a fill level measurement is no longer possible, because the accretion acts as if it were a metallic isolation around the probe.

Thus, an object of the invention is to provide a capacitive measuring apparatus, with which, even in the case of media tending to accrete, the fill level can be determined as reliably as possible.

SUMMARY OF THE INVENTION

The invention achieves the object by the features that: The evaluating unit ascertains a statement concerning accretion on the probe unit from the response signal and/or from the time behavior of the response signal; stored in the evaluating unit are at least a first and a second formula or a first and a second evaluating algorithm; in case accretion lies below a predetermined limit value, the evaluation unit determines the statement concerning fill level from the response signal via the first formula and/or via the first evaluating algorithm; and, in case accretion lies above the predetermined limit value, the evaluating unit determines the statement concerning fill level via the second formula and/or via the second evaluating algorithm. The evaluating unit is so embodied that it first determines from the response signal a statement concerning the accretion. Besides the capacitive measuring device, thus, no other measuring device is required, but, instead, alone on the basis of the effects of the accretion on the response- or measurement-signal, already conclusions are reached as concerns the accretion. This is, consequently, a cost-effective solution.

Additionally, depending on the degree of accretion, reference is made to one of the at least two evaluating formulas or evaluating algorithms. This builds on the fact that the accretion does not act identically on all variables of the response signal. Consequently, it is possible to refer to the more suitable formula for each case.

An embodiment provides that the evaluating unit ascertains a statement concerning an accretion from a combination of phase and amplitude of the response signal. The response signal is a signal having a, most often, complex amplitude and phase relative to the drive signal or to a further reference signal. The behavior of phase and amplitude under the influence of accretion as a function of fill level is different in each case. An evaluating of phase and imaginary and real parts of the amplitude, or a combination of the variables, permits a statement concerning accretion. A calculative processing of the variables with appropriate factors permits, for example, the providing of a tolerance band, within which only a negligible accretion arises. If the accretion is, however, negligible, than further calculating can be with the formula, or with the algorithm, used in the absence of accretion. Thus, for example, the amplitude, or a part thereof, e.g. the imaginary part, is evaluated. If the accretion is, however, greater than the value associated with the limit of the tolerance band, then a formula must be applied, which is less influenced by accretion. For example, phase can preferably be evaluated in the case of strong accretion, since this, in contrast to amplitude, shows a dependence on fill level even in the case of accretion. If, however, no accretion is present, then the phase is ideally about 90° for each fill level, so that, without accretion, a considering of phase in the determining of fill level is less helpful. Consequently, the correct formula to be applied depends on the particular case.

An embodiment includes that, in case accretion lies below a predetermined limit value, the evaluating unit determines the statement concerning fill level from the amplitude, or from a part of the amplitude, of the response signal, and, in case accretion lies above the predetermined limit value, the evaluating unit determines the statement concerning fill level from the phase of the response signal. As already discussed above, in case only a small accretion is present, the amplitude or a part of the amplitude, e.g. the imaginary part or a combination of imaginary and real parts, for example the difference between the two values, is ideal for determining fill level. If, however, accretion is present, then preference is to be given to phase.

An embodiment provides that the fill level determinable by the evaluating unit lies between a minimum and a maximum value of fill level, that at least a lower value of fill level and/or an upper value of fill level are/is predeterminable as switching point or points, wherein the lower value of fill level and/or the upper value of fill level lie/lies between the minimum and maximum values of fill level. The measuring device is applied, consequently, as a two-point switch, or serves for controlling fill level between a lower and an upper value. This is, for example, advantageous, in order to control the fill level of medium in an intermediate storage. The minimum value of fill level is usually given by the lower end of the probe unit. The maximum value of fill level lies, most often, near to the securement of the probe unit. The values of fill level to be monitored thus lie between these two extremes.

An embodiment includes that: At least one memory unit is provided, wherein, stored in the memory unit, associated with the upper value of fill level, are an upper phase value and an upper amplitude value or an upper amplitude value part, and/or wherein, stored in the memory unit, associated with the lower value of fill level, are a lower phase value and a lower amplitude value or a lower amplitude value part; the evaluating unit, for determining the statement concerning fill level, compares the phase and/or the amplitude and/or the amplitude part and/or a combination of phase and amplitude and/or part of the amplitude of the response signal with the corresponding values associated with the switching points; and the evaluating unit, upon reaching by the response signal of one of the values associated with a switching point signals the reaching of the associated switching point. This embodiment of the two-point switch relates to the fact that especially applied for determining fill level is phase in the case of accretion and amplitude in the case of only little accretion. For the functioning as switch, the evaluating unit monitors the corresponding values of the response signal and reports an exceeding or falling below of the associated limit values. Which variable is referenced for monitoring fill level results, in such case, from the response signal. I.e., the evaluating unit derives first from the response signal whether accretion is present. From this information, it follows, whether phase or amplitude is referenced for monitoring fill level. Finally, the measurement variable suited to the situation is compared with the associated limit values. This embodiment is thus especially advantageous for controlling in a container the fill level of a medium having a tendency for accretion formation. Since, moreover, the maximum and minimum fill level values lie above, respectively below, the two values of fill level to be monitored, additionally an extra monitoring is provided, where also the reaching of these extreme values is being monitored.

An embodiment provides that the evaluating unit determines a statement concerning accretion on the probe unit from a deviation of the phase of the response signal beyond a predeterminable tolerance range from a predeterminable desired value of phase and/or from a deviation of the amplitude and/or an amplitude part beyond a predeterminable tolerance range from a predeterminable desired value of amplitude and/or from a deviation of the response signal beyond a predeterminable tolerance range of a combination desired value for a combination of phase and amplitude and/or an amplitude part. Further statements concerning accretion can be won by comparing the response signal with corresponding desired values. If a deviation beyond an associated tolerance range is present, then accretion is detected. The desired value of phase is 90 degrees. If accretion is present, phase usually lies below this value.

An embodiment includes that: The evaluating unit wins a statement from the amplitude or amplitude part concerning accretion on the probe unit, when the amplitude or amplitude part remains, in the case of decreasing fill level, beyond a predetermined measure of tolerance above a lower value of amplitude. If fill level sinks, usually also amplitude decreases. Because of the accretion, however, amplitude increases. This is the problem in the case of fill level determination. Here, however, in the detection of accretion, this negative effect is used for such detection. Thus, if amplitude does not sink below a predeterminable value, then this can only be a result of accretion.

An embodiment provides that the evaluating unit ascertains a statement concerning accretion on the probe unit from a plausibility comparison between phase and amplitude or amplitude part.

An embodiment includes the feature that the effective probe length of the probe unit in the container is less than 1 meter. In one embodiment, the probe length within the container is less than 50 cm. The container is, thus, for example, an intermediate tank interposed between the actual tank for the medium and, for example, a bottling plant.

BRIEF DESCRIPTION OF THE DRAWING

The invention will now be explained in greater detail on the basis of the appended drawing, the FIGURE of which shows as follows:

FIG. 1 a schematic representation of a measuring device with the measurement apparatus of the invention.

DETAILED DISCUSSION

In FIG. 1, an intermediate container 2 is filled with medium 1 from an upstream tank 7. From container 2 there then follows filling into individual vessels, shown here, by way of example, as bottles 8. The height of such intermediate container amounts often to a value between 30 cm and 50 cm. Medium 1 is thus, for example, a liquid soap, or a liquid food, such as mustard or ketchup. A problem with such highly viscous and simultaneously very conductive media involves accretion formation on the probe unit 3. Probe unit 3 is, for example, a probe rod or a probe cable. By the accretion, the probe becomes quasi shielded. Thus, this problem involves the fact that the actual, electrically conductive probe is surrounded by an isolating layer. A drive signal from a control unit 4 is applied to the probe unit 3. The drive signal is usually an electrical, alternating voltage of predeterminable frequency. The frequency of the drive signal also has effects in the state of the art, affecting, thus, also the limit and tolerance values predetermined for determining the accretion. Evaluating unit 5 receives a response signal from the probe unit. Usually, this is an electrical current signal, which is converted, for example, via a resistor into a voltage signal. Control unit 4 and evaluating unit 5 are, in an embodiment, combined into a single unit. Such unit is, preferably, an electronics unit controlled by a microprocessor. Evaluating unit 5 is embodied in such a manner that it digitizes the response signal and, in so doing, makes the total signal accessible for evaluation. In the evaluating unit 5, a statement concerning an accretion on the probe unit 3 is first obtained from the response signal. If, for example, phase is about 90°, then either no accretion is present or, in the case of accretion, the fill level is near to the maximum fill level or the upper switching point. Therefore, the amplitude must be investigated. If the amplitude points to a low fill level, then the phase of about 90° results from the normal phase on the capacitor and there is no accretion. Corresponding considerations of phase and amplitude or an amplitude part, i.e. an imaginary part or real part, or a combination of phase and amplitude, can be set up for all other cases. In the final analysis, a statement concerning accretion is obtained, and with this knowledge, then the suitable formula or suitable evaluation algorithm can be applied for determining and/or monitoring fill level. If there is no accretion, then it is preferred to evaluate amplitude, e.g. evaluate the imaginary part thereof. If an accretion is adhering, then evaluation of phase is advantageous.

In the case shown here, the measuring device serves for controlling fill level of the medium inside the intermediate container 2. The goal is that the fill level should always be located between a lower and an upper value. This range is located within the range between maximum and minimum fill level. Even in the case of accretion, the extreme values are still monitored, so that an increased safety is provided. I.e., even in the case of exceeding of the switching values, the extreme values are still limiting. With the switching points, pumps or valves can be controlled in such a manner that a reaching of the lower switching point leads to a flow of medium 1 into the container 2 and a reaching of the upper switching point to a stopping of further filling. Such a control has the advantage that the switching ranges do not produce sharp limits. Such switching zones thus also take into consideration that, due to the accretion, highly precise statements are not always possible. If it is, however, recognized that the accretion is too large and that, consequently, further measurements are not feasible, then, for example, a warning notice is issued. For the switching points, here, corresponding limit values and tolerance ranges are stored in the memory unit 6. Depending on the evaluation, i.e. depending on whether accretion is present, also appropriate values are of concern. In the case of accretion, phase is evaluated, so phase values associated with the switching points are stored in the memory unit 6.

LIST OF REFERENCE CHARACTERS

1 medium
2 container
3 probe unit
4 control unit
5 evaluation unit
6 memory unit
7 tank
8 bottles

The invention claimed is:

1. An apparatus for capacitive determining and/or monitoring of fill level of a medium in a container, comprising:
   at least one probe unit;
   at least one control unit, which supplies the probe unit with a drive signal; and
   at least one evaluating unit, which receives from said probe unit at least one response signal, and which determines from the response signal at least one statement concerning fill level, wherein:
   the response signal has at least one amplitude and one phase relative to the drive signal and/or relative to a reference signal;
   said evaluating unit ascertains, from the response signal and/or from the time behavior of the response signal, a statement concerning accretion on the probe unit;
   stored in said evaluating unit are at least a first and a second formula, or a first and a second evaluating algorithm;
   in case accretion lies below a predetermined limit value, said evaluating unit determines the statement concerning fill level from the response signal via the first formula and/or via the first evaluating algorithm;
   in case accretion lies above a predetermined limit value, said evaluating unit determines the statement concerning fill level from the response signal via the second formula and/or via the second evaluating algorithm; and
   said evaluating unit ascertains a statement concerning accretion from a combination of phase and amplitude of the response signal.

2. The apparatus as claimed in claim 1, wherein:
   the fill level determinable by said evaluating unit lies between a minimum and a maximum fill level value;
   at least a lower fill level value and/or an upper fill level value are/is predeterminable as switching points/switching point; and
   the lower fill level value and/or the upper fill level value lie/lies between the minimum and the maximum fill level values.

3. The apparatus as claimed in claim 2, further comprising:
   at least one memory unit, wherein:
   stored in said memory unit are, associated with the upper fill level value, an upper phase value and an upper amplitude value or an upper part of an amplitude value, and/or stored in said memory unit are, associated with the lower fill level value, a lower phase value and a lower amplitude value or lower part of an amplitude value;
   said evaluating unit, for determining the statement concerning fill level, compares phase and/or amplitude and/or a combination of phase and amplitude and/or a part of amplitude of the response signal with the corresponding values associated with the switching points; and
   said evaluating unit, upon reaching by the response signal of one of the values associated with a switching point, signals the reaching of the associated switching point.

4. The apparatus as claimed in claim 1, wherein:
   said evaluating unit determines a statement concerning accretion on said probe unit from a deviation of phase of the response signal beyond a predeterminable tolerance range from a predeterminable, desired value of phase, and/or from a deviation of amplitude and/or a part of amplitude beyond a predeterminable tolerance range from a predeterminable, desired value of amplitude, and/or from a deviation of the response signal beyond a predeterminable tolerance range from a predeterminable, combination desired value for a combination of phase and amplitude and/or a part of amplitude.

5. The apparatus as claimed in claim 1, wherein:
   the probe length of said probe unit effective in the container is less than 1 meter.

6. An apparatus for capacitive determining and/or monitoring of fill level of a medium in a container, comprising:
   at least one probe unit;
   at least one control unit, which supplies the probe unit with a drive signal; and
   at least one evaluating unit, which receives from said probe unit at least one response signal, and which determines from the response signal at least one statement concerning fill level, wherein:
   the response signal has at least one amplitude and one phase relative to the drive signal and/or relative to a reference signal;
   said evaluating unit ascertains, from the response signal and/or from the time behavior of the response signal, a statement concerning accretion on the probe unit;
   stored in said evaluating unit are at least a first and a second formula, or a first and a second evaluating algorithm;
   in case accretion lies below a predetermined limit value, said evaluating unit determines the statement concerning fill level from the response signal via the first formula and/or via the first evaluating algorithm;
   in case accretion lies above a predetermined limit value, said evaluating unit determines the statement concerning fill level from the response signal via the second formula and/or via the second evaluating algorithm;
   in case accretion lies under a predetermined limit value, said evaluating unit determines the statement concerning fill level from amplitude or a part of amplitude of the response signal; and,
   in case accretion lies above a predetermined limit value, said evaluating unit determines the statement concerning fill level from phase of the response signal.

7. An apparatus for capacitive determining and/or monitoring of fill level of a medium in a container, comprising:
   at least one probe unit;
   at least one control unit, which supplies the probe unit with a drive signal; and
   at least one evaluating unit, which receives from said probe unit at least one response signal, and which determines from the response signal at least one statement concerning fill level, wherein:

the response signal has at least one amplitude and one phase relative to the drive signal and/or relative to a reference signal;
said evaluating unit ascertains, from the response signal and/or from the time behavior of the response signal, a statement concerning accretion on the probe unit;
stored in said evaluating unit are at least a first and a second formula, or a first and a second evaluating algorithm;
in case accretion lies below a predetermined limit value, said evaluating unit determines the statement concerning fill level from the response signal via the first formula and/or via the first evaluating algorithm;
in case accretion lies above a predetermined limit value, said evaluating unit determines the statement concerning fill level from the response signal via the second formula and/or via the second evaluating algorithm;
said evaluating unit obtains a statement concerning accretion on said probe unit from amplitude or a part of amplitude, when the amplitude or the part of the amplitude, in the case of decreasing fill level, remains beyond a predetermined measure of tolerance above a lower amplitude value.

8. An apparatus for capacitive determining and/or monitoring of fill level of a medium in a container, comprising:
at least one probe unit;
at least one control unit, which supplies the probe unit with a drive signal; and
at least one evaluating unit, which receives from said probe unit at least one response signal, and which determines from the response signal at least one statement concerning fill level, wherein:
the response signal has at least one amplitude and one phase relative to the drive signal and/or relative to a reference signal;
said evaluating unit ascertains, from the response signal and/or from the time behavior of the response signal, a statement concerning accretion on the probe unit;
stored in said evaluating unit are at least a first and a second formula, or a first and a second evaluating algorithm;
in case accretion lies below a predetermined limit value, said evaluating unit determines the statement concerning fill level from the response signal via the first formula and/or via the first evaluating algorithm;
in case accretion lies above a predetermined limit value, said evaluating unit determines the statement concerning fill level from the response signal via the second formula and/or via the second evaluating algorithm;
said evaluating unit ascertains a statement concerning accretion on said probe unit from a plausibility comparison between phase and amplitude or part of amplitude.

* * * * *